Figure 1:
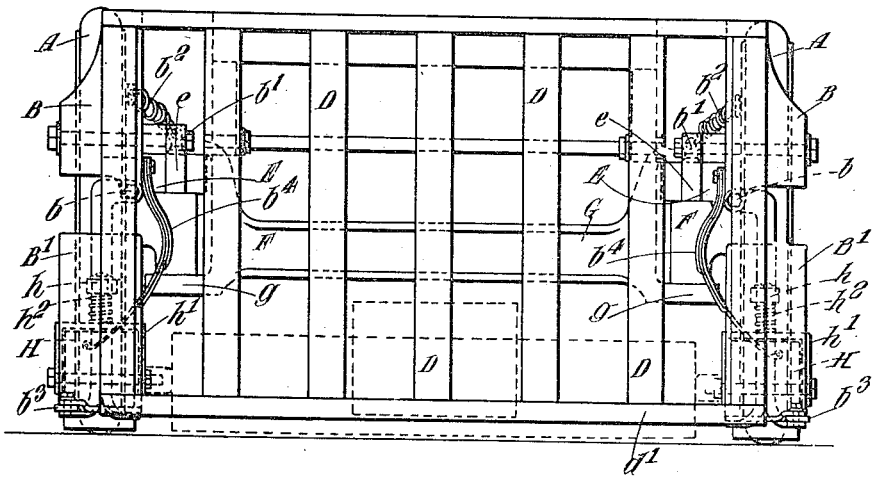

E. J. BUCKINGHAM.
VEHICLE WHEEL GUARD.
APPLICATION FILED JUNE 29, 1914.

1,143,035.

Patented June 15, 1915.
2 SHEETS—SHEET 1.

Attest:
Edwd L. Tolson
B. L. Bishop

Inventor:
Edward J. Buckingham,
by Spear, Middleton, Donaldson & Spear
Attys.

E. J. BUCKINGHAM.
VEHICLE WHEEL GUARD.
APPLICATION FILED JUNE 29, 1914.

1,143,035.

Patented June 15, 1915.
2 SHEETS—SHEET 2.

Attest:
Ewd L. Tolson
B. L. Bishop

Inventor:
Edward J. Buckingham,
by Spear, Middleton, Donaldson & Spear
Attys.

UNITED STATES PATENT OFFICE.

EDWARD JOHN BUCKINGHAM, OF BRIXTON OVAL, LONDON, ENGLAND.

VEHICLE WHEEL-GUARD.

1,143,035.  Specification of Letters Patent.  Patented June 15, 1915.

Application filed June 29, 1914. Serial No. 848,034.

*To all whom it may concern:*

Be it known that I, EDWARD JOHN BUCKINGHAM, a subject of the King of Great Britain, residing at Brixton Oval, in the county of London, England, have invented certain new and useful Improvements in Vehicle Wheel-Guards, of which the following is a specification.

This invention relates to the construction of spring controlled pivoted safety guards for vehicle wheels, especially those of heavy motor vehicles, such as motor omnibuses, the chief object of the invention being to provide a light construction applied independently to each wheel which will effectively prevent any person being caught and drawn under the wheel.

According to my invention a spring controlled guard, pivoted at its upper end to an arm or bracket and extending forwardly at its lower ends is provided with a safety wheel or roller, spring mounted on a bracket on the back of the guard so as to meet the vehicle wheel on backward movement of the guard and adapted to yield vertically against the pressure of the spring. The safety roller when it meets the wheel rotates in the opposite direction and tends to drive away from the wheel any object which may lie on the ground in front, as in safety roller arrangements already proposed, and owing to its position between the guard and wheel, it prevents the former meeting the ground in case of the wheel entering a rut or hole. The guard is preferably made in two parts, the upper one being pivoted to the supporting arm and the lower hinged or pivoted to the upper part so as to move inwardly against the pressure of a spring, a small roller at the side of a forward extension or ledge of the guard meeting the pavement or any obstacle at the side of the vehicle and preventing injury to the guard. The arm or bracket carrying the guard is made in two parts pivoted to each other and arranged to allow the guard to move upwardly around the pivot against the pressure of a helical spring arranged on a downwardly extending rod carried by the movable part of the arm. This arrangement of spring joint permits of ample vertical movement to prevent injury to the guard by irregularities of the road. A jointed supporting arm with a spring has already been proposed in conjunction with a spring wheel guard pivoted on the end of the arm so as to allow of a limited transverse movement against the pressure of a spring. In association with the front wheel guards I may also use a transverse guard with a bottom ledge, extending across the front of the vehicle and carried either by the vehicle body or the front axle. This guard may be pivotally mounted on the vehicle frame just in front of the wheel guards and so arranged that on an object striking the front guard it abuts against the wheel guards and presses them back, moving the safety wheels against the vehicle wheels in the manner already described.

In order that the said invention may be clearly understood and readily carried into effect I will describe the same more fully with reference to the accompanying drawings, in which:—

Figure 3:
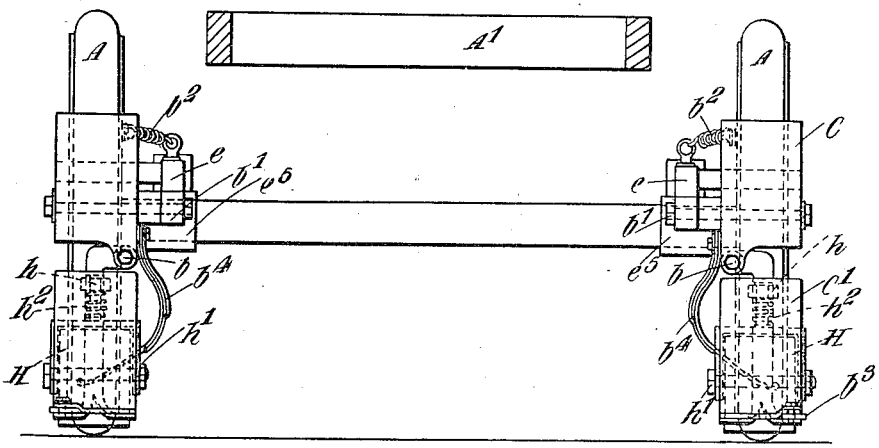
Figure 2:
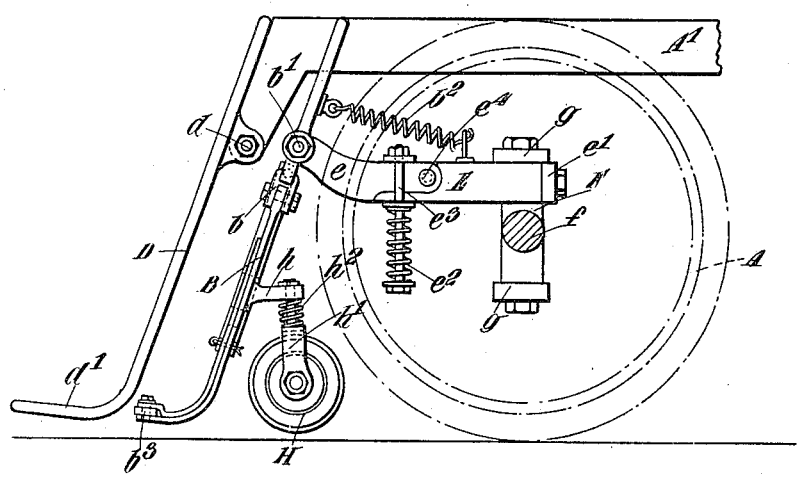
Figure 4:
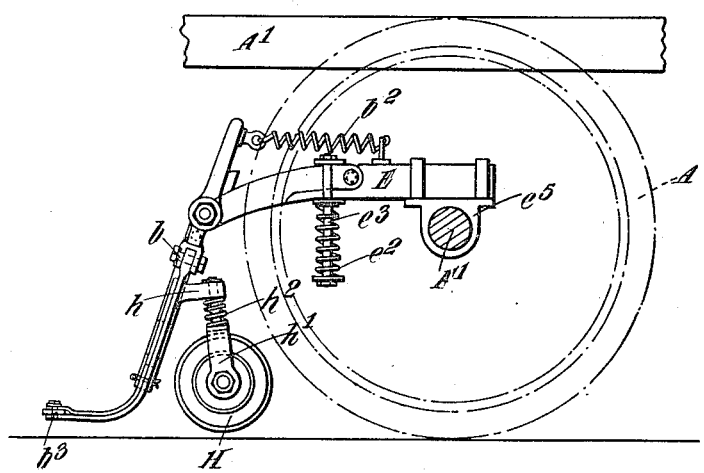

Figure 1 is a front elevation, and Fig. 2 a side elevation of a guard applied to the front wheels of a vehicle; and Figs. 3 and 4 are similar views of the back wheel guards.

A, A are the vehicle wheels.

B, B' are the front wheel guards, made in two main parts pivoted or hinged together at $b$ so that the lower member B' can bend inwardly or toward the axis of the vehicle.

C, C' are the back wheel guards similarly constructed in two parts.

D is the transverse guard extending across the front of the vehicle.

Referring to Figs. 1 and 2, the wheel guard B, B' is mounted on the arm or bracket E through the hinged extension $e$, to the end of which it is pivoted at $b'$. The arm E is clamped to the head F of the axle barrel $f$, which head is carried in the fork $g$ of the fixed axle G in the usual manner. The end of the arm E is forked to embrace the head F and a clamping plate $e'$ at the back of the head serves for clamping purposes. A spring $e^2$ and rod $e^3$ connect the extension $e$ to the arm or bracket E so that the guard B, B' can lift around the hinge $e^4$ against the pressure of the spring $e^2$ in case of necessity. The spring $b^2$ connects the upper guard member B to the bracket E and keeps the guard forward but allows it to yield on meeting an obstacle.

The lower guard member B' carries the safety wheel or roller H between it and the front of the vehicle wheel A, this roller being mounted on the bracket $h$ by means of the fork $h'$ and spring $h^2$ in such a manner that it can rise over stones or small obstacles without affecting the guard. At the outer lower corner of the guard member B' is placed a small horizontal roller $b^3$ the object of which is to avoid injury of the guard by the curb or other obstacle meeting it sidewise. Should the vehicle be brought close to the curb and the guard come into contact with the latter, the roller $b^3$ would merely run along the curb, causing the lower guard member B' to move inwardly against the pressure of the spring $b^4$, which normally maintains the two guard members in line with each other.

The transverse guard D is pivoted at $d$ to the front of the vehicle frame A' and is conveniently constructed of wooden slats with a ledge $d'$ at its lower edge to catch any obstacles which may be met. On meeting an obstacle it is pressed back into contact with the guards B, B' which allow it to yield in a resilient manner for a limited distance.

The operation of the front guard is as follows:—In ordinary straight running of the vehicle the relative position of the transverse and wheel guards is as shown in Fig. 1, the steering wheels A lying symmetrically behind the edges of the guard D. On turning, however, the wheels A take up an angular position so that one of the wheel guards B, B' is turned along with the wheel, outside the limit of the guard D while the other guard B, B' is turned behind the guard D. The wheels A are protected whether in straight or steering position, since the guards B, B' turn with them. If an obstacle meets the transverse guard D it abuts against the front edge of the guards B, B' which allow it to yield resiliently for a short distance to reduce the shock. As the guards all slope back, any backward movement of the lower part causes the bottom edge to approach the ground, so that there is no danger of a foot passenger or an obstacle of substantial dimensions getting under the guard. If one of the wheel guards B, B' meets an obstacle it is pressed back, turning around the pivot $b'$ against the force of the spring $b^2$ until the safety roller H meets the wheel A. The roller H rotates in the opposite direction to the vehicle wheel and thus prevents any article (such as a portion of the dress of a foot passenger who may have been struck by the vehicle) getting caught under the wheel, the oppositely rotating roller acting to drive the article away from the wheel.

Referring to the wheel guard for the rear wheels, shown in Figs. 3 and 4, the arrangement is practically the same except for a slight difference in mounting the arm of bracket E on the shaft F' and the fact that the guard does not need to turn on steering the vehicle. The arm E is carried by the table $e^5$ encircling the shaft F' just inside the wheel. The guard B, B' is somewhat shorter than that used for the front wheels and the pivot $b'$ may be placed nearer the ground, the arm extension $e$ being curved downwardly for this purpose.

What I claim and desire to secure by Letters Patent of the United States is:—

1. A safety guard for vehicle wheels, comprising a pivoted guard placed in front of the wheel and provided with a forwardly extending bottom platform, a bracket on the back of the said guard, a safety roller mounted so as to move vertically in the said bracket and to meet the vehicle wheel on rearward movement of the guard and a spring controlling the said roller.

2. A safety guard for vehicle wheels, comprising a guard composed of an upper and a lower member, a supporting arm to which the upper member is pivoted, an approximately horizontal hinge connecting the lower to the upper member and adapted to allow the lower member to yield transversely of the vehicle, a spring holding the lower member in normal position and a spring maintaining the guard resiliently in forward position on its supporting arm.

3. A safety guard for vehicle wheels, comprising a guard composed of two hinged members, a supporting arm made in two pivoted parts to one of which the upper member is pivoted and springs at each pivot so arranged that the guard can yield resiliently sidewise, rearwardly and upwardly.

4. A safety guard for vehicle wheels, comprising a pivoted and spring supported guard composed of two members hinged together under spring control, the lower member yielding sidewise against the pressure of the spring, and a small roller at the lower outer corner of the lower guard member.

5. A safety guard for vehicle wheels, comprising a fixed arm, an extension pivoted to the said arm so as to turn upwardly, a stop limiting downward movement of the extension, a spiral spring and rod connection between the arm and extension, a guard pivoted on the front end of the arm extension and a spring connecting the upper end of the guard to the fixed arm.

In testimony whereof I affix my signature in presence of two witnesses.

EDWARD JOHN BUCKINGHAM.

Witnesses:
 A. M. GLASS,
 T. SELBY WARDLE.